(12) United States Patent
Kitagawa

(10) Patent No.: US 8,698,060 B2
(45) Date of Patent: Apr. 15, 2014

(54) POSITION DETECTION SYSTEM, DISPLAY PANEL, AND DISPLAY DEVICE

(75) Inventor: Daiji Kitagawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 195 days.

(21) Appl. No.: 13/498,590

(22) PCT Filed: Jun. 17, 2010

(86) PCT No.: PCT/JP2010/060268
§ 371 (c)(1),
(2), (4) Date: Mar. 28, 2012

(87) PCT Pub. No.: WO2011/052263
PCT Pub. Date: May 5, 2011

(65) Prior Publication Data
US 2012/0181418 A1    Jul. 19, 2012

(30) Foreign Application Priority Data

Oct. 26, 2009  (JP) ................... 2009-245728

(51) Int. Cl.
*G06F 3/042* (2006.01)
(52) U.S. Cl.
USPC ......... 250/206.1; 250/221; 345/173; 345/175

(58) Field of Classification Search
USPC ............ 250/206.1, 221, 222.1, 222.2, 208.2; 345/156, 173, 175, 180
See application file for complete search history.

(56) References Cited

U.S. PATENT DOCUMENTS

| | | | |
|---|---|---|---|
| 2003/0006973 | A1 | 1/2003 | Omura et al. |
| 2009/0044989 | A1 | 2/2009 | Sato |
| 2012/0182268 | A1* | 7/2012 | Kitagawa et al. ............. 345/175 |

FOREIGN PATENT DOCUMENTS

| | | |
|---|---|---|
| JP | 2000-105671 A | 4/2000 |
| JP | 2002-116429 A | 4/2002 |
| JP | 2009-048238 A | 3/2009 |

OTHER PUBLICATIONS

Official Communication issued in International Patent Application No. PCT/JP2010/060268, mailed on Aug. 24, 2010.

* cited by examiner

*Primary Examiner* — Kevin Pyo
(74) *Attorney, Agent, or Firm* — Keating & Bennett, LLP

(57) ABSTRACT

Disclosed is a position detection system capable of detecting the position of a line-shaped object. From among two connected lines (E1E2 and E1'E2') created by connecting opposed intersecting points among four interesting points (E1, E2, E1', and E2'), a position detection unit (12) treats the one connected line (E1E2) with a length closer to the overall length of a rod (ST) as the position of the rod (ST) that overlaps a coordinate map region (MA).

18 Claims, 17 Drawing Sheets

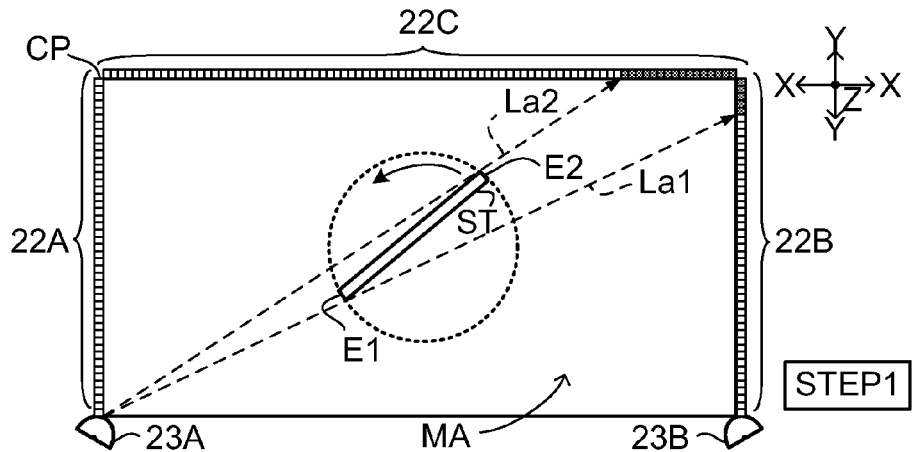
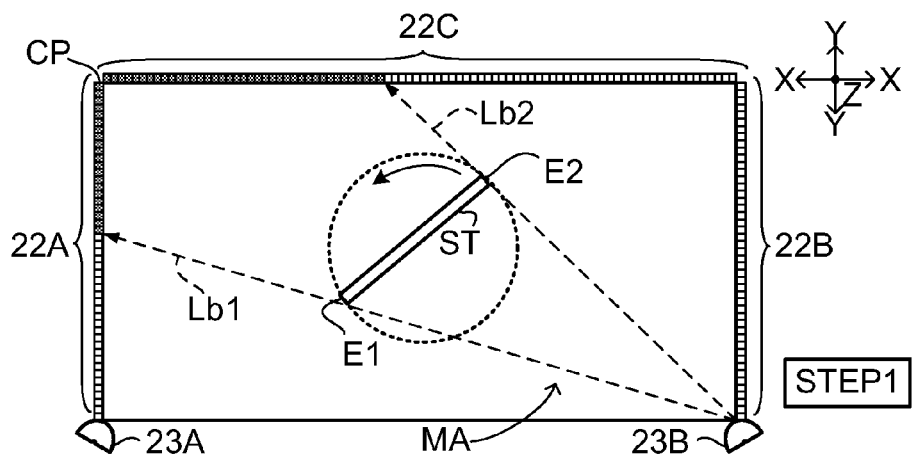
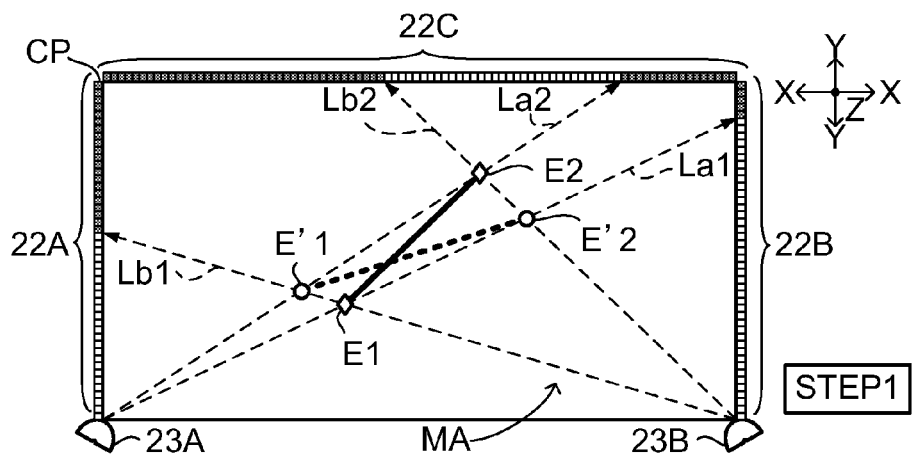

POSITION DETECTION SYSTEM, DISPLAY PANEL, AND DISPLAY DEVICE

TECHNICAL FIELD

The present invention relates to a position detection system that detects a position of an object, a display panel (liquid crystal display panel and the like) that incorporates the position detection system, and further a display device (liquid crystal display device and the like) that incorporates the display panel.

BACKGROUND ART

Recent liquid crystal display devices sometimes incorporate a touch panel that is touched by a finger or the like to allow various commands to be set on a liquid crystal display device (e.g., a patent document 1). And, in such a touch panel, a position of an object such as a finger and the like is detected.

CITATION LIST

Patent Literature

PLT1: JP-A-2000-105671

SUMMARY OF INVENTION

Technical Problem

However, the touch panel in the patent document 1 can detect a dot-like object only such as a finger and the like. In other words, this touch panel cannot detect a linear object. However, recent touch panels are expected to perform position detection of various objects.

The present invention has been made to solve the above problems. And, it is an object of the present invention to provide a position detection system and the like that allow position detection of a linear object to be performed.

Solution to Problem

The position detection system includes: a light reception line sensor unit in which a light reception line sensor is disposed in an enclosure shape; a plurality of light sources that emit light to an enclosure region enclosed by the enclosure shape to create a shadow of an object which lies on the enclosure region; and a position detection unit that detects the shadow from light reception data of the light reception line sensor unit, and uses data based on the shadow to detect a position of the object by means of triangulation.

And, in a case where the object lying on the enclosure region has a linear shape and rotates such that an end of the object draws a circular locus, the position detection unit turns on independently each of the plurality of light sources, creates one shadow of the object by turning on one of the light sources, creates another shadow of the object by turning on another of the light sources, and detects a total of two shadows.

Further, the position detection unit connects each of the light sources to both ends of the shadow on the light reception line sensor unit based on each of the light sources, thereby creating four first connection lines and finding four intersections of the four first connection lines. And, the position detection unit finds an inter-connection line created by connecting two intersections, which are intersections of the four intersections and lie on the circular locus, as the position of the object.

According to this, the position detection system does not find a position of a dot-like object but a position of a linear object. For example, the position detection system finds a line, which is one of two inter-connection lines created by connecting opposing intersections of the four intersections and has a length approximate to a total length in a linear direction of the object, as an inter-connection line. Further, besides this, when four connection lines created by connecting each of the four intersections to a central point of the circular locus are each defined as a second connection line, the position detection system finds, for example, a line, which is created by connecting intersections to each other which are included in two of the four second connection lines that have a length approximate to a radius of the circular locus, as the inter-connection line.

Here, it is desirable that the light reception line sensor unit is disposed in a bracket shape with three of the light reception line sensors being linear and meeting one another; and the position detection unit finds the total length of the linear object, which is disposed in parallel with a central light reception line sensor of the three linear light reception line sensors arranged, as a length of the inter-connection line which is one the two inter-connection lines created by connecting the opposing intersections of the four intersections and is parallel with the central light reception line sensor.

Besides, it is sayable that a display panel incorporating the position detection system also is the present invention, and it is sayable that a display device incorporating the display panel also is the present invention.

Advantageous Effects of Invention

According to the present invention, the position detection system does not find a position of a dot-like object but a position of a linear object.

BRIEF DESCRIPTION OF DRAWINGS

FIG. 1 (A) is a plan view showing a connection line that is created in a case where one of two LEDs emits light to a rod; and (B) is a plan view showing a connection line that is created in a case where the other of the two LEDs emits light to the rod.

FIG. 2 is a plan view showing both connections lines shown in FIG. 1A and FIG. 1B.

DESCRIPTION OF EMBODIMENTS

Embodiment 1

An embodiment is described with reference to drawings as follows. Here, for the sake of convenience, there is a case where members, hatching, further, member numbers and the like are skipped; in such a case, other drawings are referred to (e.g., there is a case where a line sensor 22 described later is shown by only a light reception chip CP). To the contrary, for the sake of convenience, there also is a case where hatching is applied to a view other than a sectional view. Besides, a black dot shown together with an arrow means a direction perpendicular to the paper surface.

Figure 19:
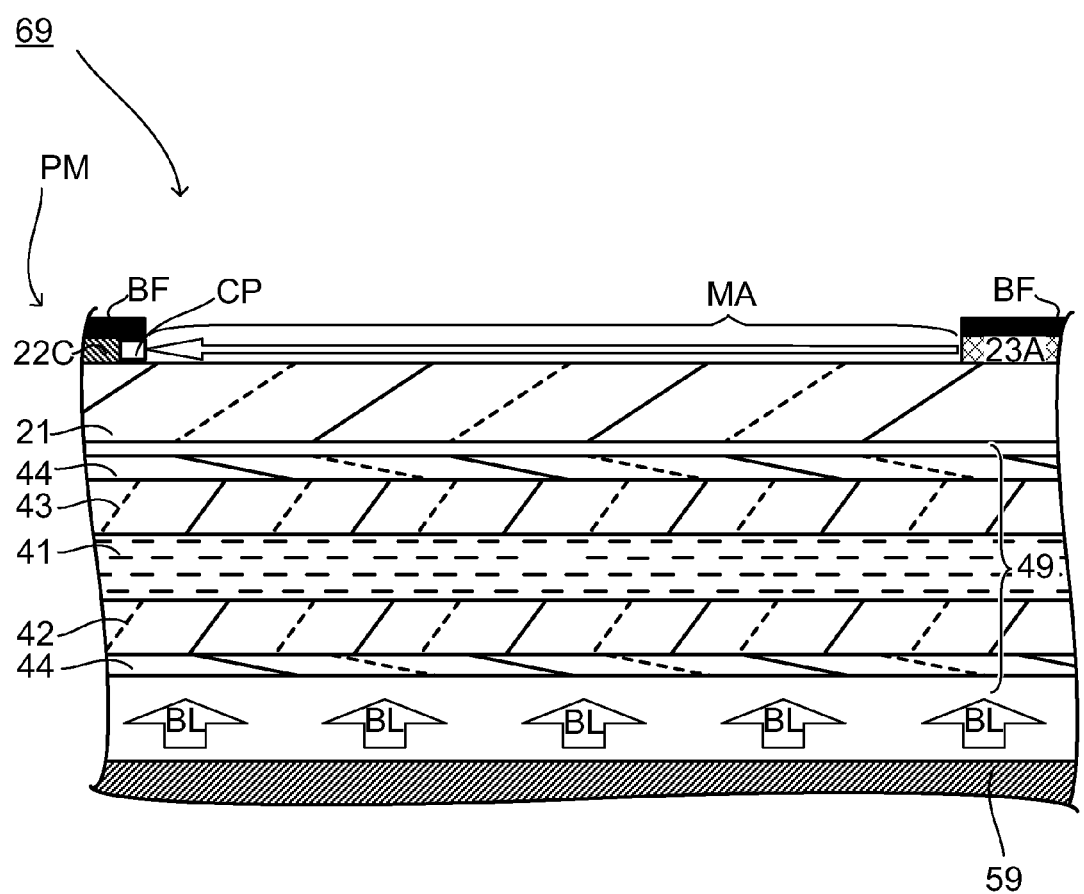
FIG. 19 is a partially sectional view of a liquid crystal display device.

FIG. 19 is a partially sectional view of a liquid crystal display device [display device] 69. As shown in this figure, the liquid crystal display device 69 includes: a backlight unit [illumination device] 59; and a liquid crystal display panel [display panel] 49.

The backlight unit 59 is, for example, an illumination device that incorporates a light source such as an LED (Light Emitting Diode), a fluorescent lamp or the like, and casts light (backlight BL) onto the liquid crystal display panel 49 that is a non-light emitting display panel.

The liquid crystal display panel 49 receiving the light includes an active matrix board 42 and an opposite board 43 that sandwich liquid crystal 41. Besides, the active matrix board 42 is provided with a gate signal line and a source signal line, not shown, disposed to cross over each other; and a switching element (e.g., Thin Film Transistor) necessary for adjustment of applied voltage to the liquid crystal (liquid crystal layer) 41 is disposed at the intersections of both signal lines.

Besides, a light polarization film 44 is mounted on a light reception side of the active matrix board 42 and on a light output side of the opposite board 43. And, the above liquid crystal display panel 49 displays an image by using a change in light transmittance due to an inclination of a liquid crystal molecule 41 that reacts to the applied voltage.

Besides, this liquid crystal display panel 49 incorporates a position detection system PM as well (here, the liquid crystal display panel 49 incorporating the position detection system PM may be called a touch panel 49). This position detection system PM is a system that detects where a rod [object] ST shown in FIG. 20 described later is situated on the liquid crystal display panel 49 in a case where the rod ST rotates.

Figure 20:
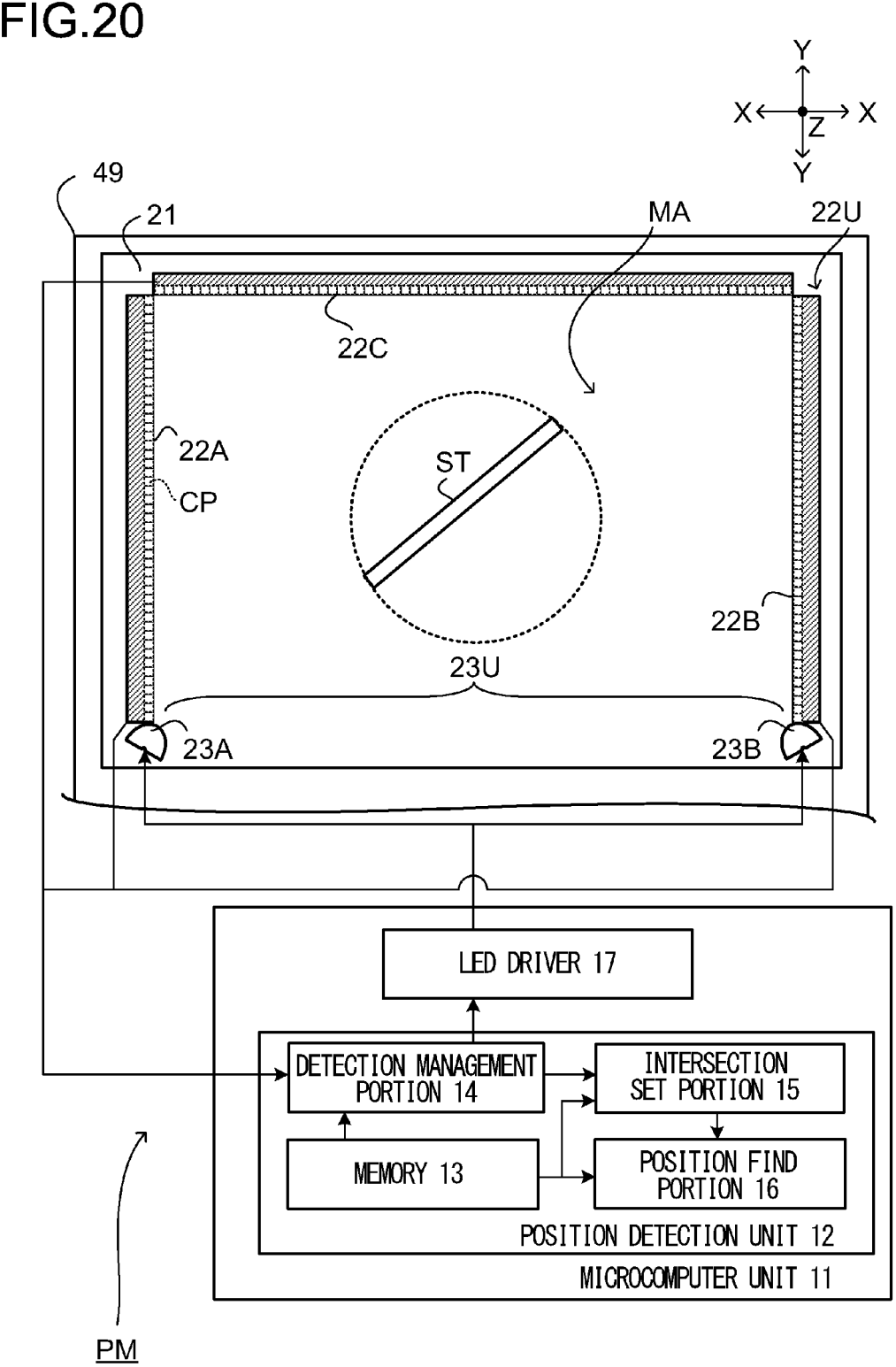
FIG. 20 is a description view showing both of a plan view of a position detection system and a block diagram of a microcomputer unit necessary for control of the position detection system.

Here, this position detection system PM is described in detail using FIG. 19 and FIG. 20 (FIG. 20 a description view showing both of a plan view of the position detection system PM and a block diagram of a microcomputer unit 11 necessary for control of this position detection system PM).

The position detection system PM includes: a protection sheet 21; a line sensor unit [light reception line sensor unit] 22U; an LED unit [light source unit] 23U; and a microcomputer unit 11.

The protection sheet 21 is a sheet that covers the opposite board 43 (in detail, the light polarization film 44 on the opposite board 43) of the liquid crystal display panel 49. When an object such as a finger or the like is disposed on the display surface of the liquid crystal display panel 49, this protection sheet 21 is present between the finger and the display surface to prevent a flaw and the like from occurring on the liquid crystal display panel 49.

The line sensor unit 22U is a unit of three line sensors 22 (22A, 22B, 22C) that include light emitting chips CP disposed linearly and are ranged on the protection sheet 21 (here, the three line sensors 22A to 22C may be formed integrally with one another into a train-like shape). In detail, in the line sensor unit 22U, the line sensors 22A to 22C are disposed into a shape (enclosure shape) that encloses a predetermined region. However, the disposition shape of the line sensor unit 22U is not especially limited if the shape encloses the predetermined region.

For example, the line sensor unit 22U includes: the line sensor 22A and the line sensor 22B that are disposed oppositely to each other; and the line sensor [side type of linear light reception sensor] 22C that bridges the line sensor [side type of linear light reception sensor] 22A and the line sensor [side type of linear light reception sensor] 22B, whereby the line sensors 22A to 22C are disposed into a bracket shape ("]" shape) that encloses the predetermined region (in short, the line sensor unit 22U is disposed into the ] shape with the three line sensors 22A, 22B and 22C being linear and meeting one another).

Here, the rectangular region enclosed by the line sensors 22A to 22C of the line sensor unit 22U is defined as a coordinate map region MA [enclosure region]. Besides, a line direction of the line sensor 22C is defined as an X direction, a line direction of the line sensors 22A and 22B is defined a Y direction, and a direction crossing over (meeting at right angles or the like) the X direction and the Y direction is defined as a Z direction.

The LED unit 23 is a unit of two LEDs 23 (23A, 23B) that are disposed on the protection sheet 21. In detail, in the LED unit 23, the LEDs [point light source] 23A, 23B are spaced from each other and disposed to oppose the line sensor 22C. And, the LEDs 23A, 23B extend a traveling direction of output light [light source light] along a sheet surface (an XY plane direction defined by the X direction and the Y direction) of the protection sheet 21, and orient the traveling direction to the coordinate map region MA enclosed by the line sensors 22A to 22C.

In detail, the LED 23A is disposed near one end of the line sensor 22A that is not adjacent to the line sensor 22C, whereby the output light from the LED 23A reaches throughout the coordinate map region MA. Besides, the LED 23B is disposed near one end of the line sensor 22B that is not adjacent to the line sensor 22C, whereby the output light from the LED 23B reaches throughout the coordinate map region MA.

It is advantageous that the line sensor unit 22U (line sensors 22A to 22C) and the LED unit 23U (that is, LEDs 23A, 23B) are provided with a light block film BF that curbs light leakage to outside. For example, as shown in FIG. 19, it is advantageous that the light block film BF is attached to an outer surface of the line sensor 22 that faces the outside and to an outer surface of the LED 23 that faces the outside.

The microcomputer unit 11 controls the position detection system PM, and includes an LED driver 17 and a position detection unit 12.

The LED driver 17 is a driver that supplies an operation electric current to the LEDs 23A, 23B of the LED unit 23U.

The position detection unit 12 includes: a memory 13; a detection management portion 14; a intersection set portion 15; and a position find portion 16.

Figure 21A:
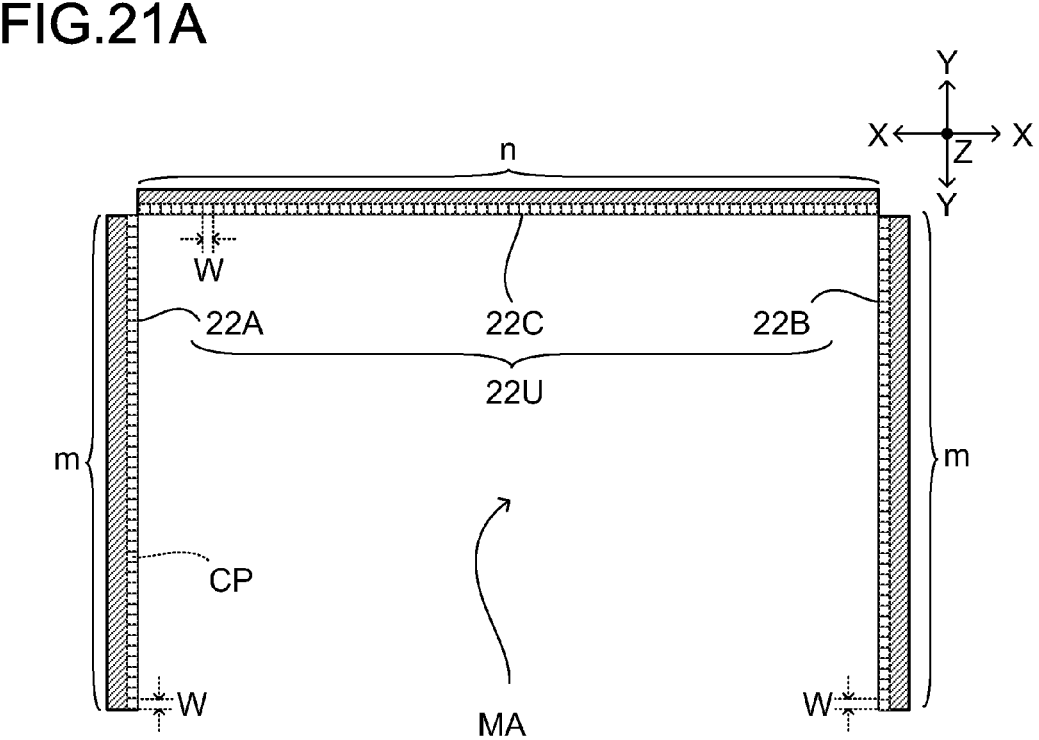
FIG. 21 (A) is a plan view showing a line sensor unit; and (B) is a plan view showing a coordinate map region.

The memory 13, in a case where an object such as a finger or the like is disposed on the coordinate map region MA, stores the coordinate map region MA to find a position of the finger or the like. The coordinate map region MA is defined, for example, by the number of the light reception chips CP that are built in the line sensors 22A to 22C which are disposed in the parenthesis shape as shown in FIG. 21A.

For example, it is assumed that the line sensor 22A includes m light reception chips CP; the line sensor 22B includes m light reception chips CP; and the line sensor 22C includes n light reception chips CP (here, both n and m are plural). And, in this line sensor unit 22U, in the line sensors 22A and 22B disposed in parallel with each other, the outermost light reception chip CP of the line sensor 22A and the outermost light reception chip CP of the line sensor 22B oppose each other in the X direction. Further, the line sensor 22C bridges both of the outermost light reception chips CP of the line sensors 22A and 22B that oppose each other.

According to this, the coordinate map region is divided by a large sectional region that is formed by extending a width W of each of the light reception chips CP of the line sensors 22A to 22C in a direction perpendicular to the line directions of the line sensors 22A to 22C that include each of the light reception chips CP.

In detail, the width W of each of the light reception chips CP of the line sensor 22A extends in the X direction to form m large sectional regions, while the width W of each of the light reception chips CP of the line sensor 22B extends in the X direction to form m large sectional regions (here, the large sectional region based on the light reception chips CP included in the line sensor 22A agrees with the large sectional region based on the light reception chips CP included in the line sensor 22B). Besides, the width W of each of the light reception chips CP of the line sensor 22C extends in the Y direction to form n large sectional regions.

Figure 21B:
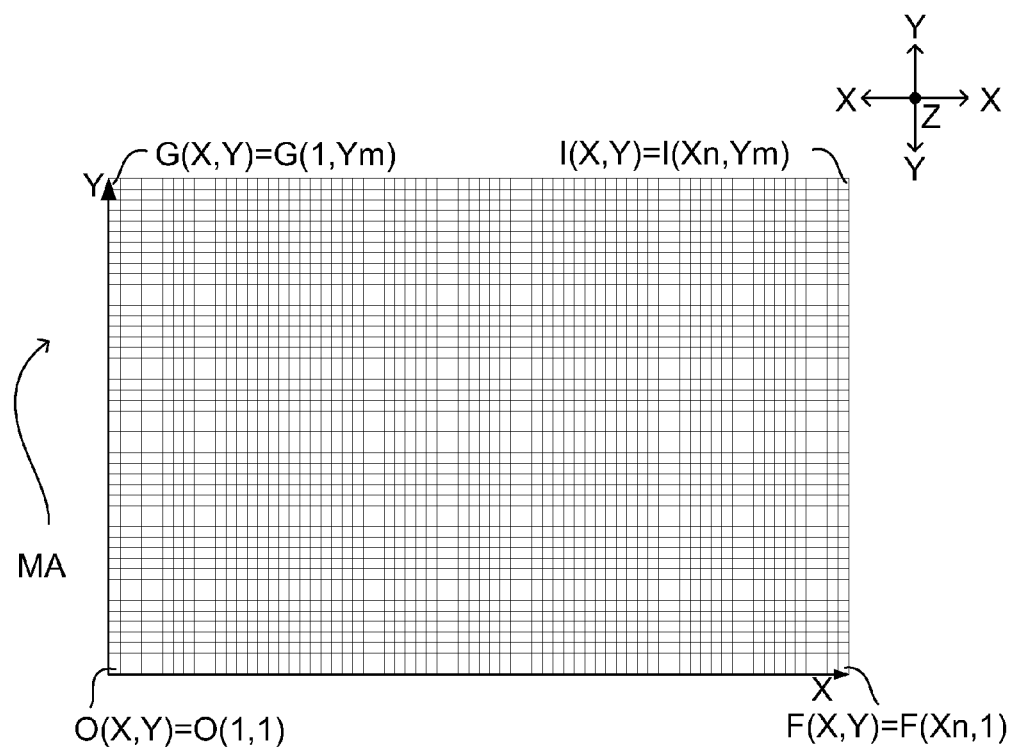

And, when the overlapping region of these large sectional regions is defined as a small section, the coordinate map region MA, as shown in FIG. 21B, becomes a region crammed with many small sections (in other words, the coordinate map region MA having a matrix of small sections is formed). And, thanks to the forming of such coordinate map region MA, the position of a finger or the like on the coordinate map region MA becomes findable.

Here, a longitudinal direction of the rectangular coordinate map region MA is along the X direction, while a short direction is along the Y direction. And, in the line sensor 22A and the line sensor 22C that are adjacent to each other, the small section, which is defined by: the large sectional region based on the light reception chip CP that is situated at the end of the line sensor 22A which is not adjacent to the end of the line sensor 22C; and the large sectional region based on the light reception chip CP that is situated at the end of the line sensor 22C which is adjacent to the end of the line sensor 22A, defined as a base section O for the sake of convenience; and its position is expressed as $O(X, Y)=O(1, 1)$ (here, it is understandable that the output point of the LED 23 lies on the position of this base section O).

Besides, the section, which is situated at a Y-direction position (Y coordinate) that is the same Y-direction position of the base section O and at the maximum X-direction position (X coordinate), is defined as a section F, and its position is expressed as $F(X, Y)=F(Xn, 1)$ (here, it understandable that the output point of the LED 23F lies on the position of this section F. Besides, n is equal to the number of the light reception chips CP of the line sensor 22C).

Besides, the section, which is situated at an X-direction position that is the same X-direction position of the base section O and at the maximum Y-direction position, is defined as a section G, and its position is expressed as $G(X, Y)=F(1, Ym)$ (m is equal to the number of the light reception chips CP of each of the line sensors 22A and 22B). Besides, the section, which is situated at the maximum X-direction position and at the maximum Y-direction position, is defined as a section I, and its position is expressed as $I(X, Y)=I(Xn, Ym)$.

Here, in a case where the rod (linear body) ST having a specific length rotates, that is, a case where the rod ST rotates and an end of the rod ST draws a circular locus, the position detection system PM detects a position of the rod ST (here, for the position detection of the rod ST, a total length of the rod ST is stored beforehand in the memory 13).

The detection management portion 14 controls the LED unit 23U via the LED driver 17, and checks a light reception state of the line sensor unit 22U via the line sensor unit 22U. In detail, the detection management portion 14 uses a control signal to control light emission timing, light emission time and the like of the LEDs 23A and 23B, and counts the number of shadows casted on the line sensors 22A to 22C based on a value (signal intensity) of a light reception signal from the line sensors 22A to 22C [shadow count process].

Figure 22A:
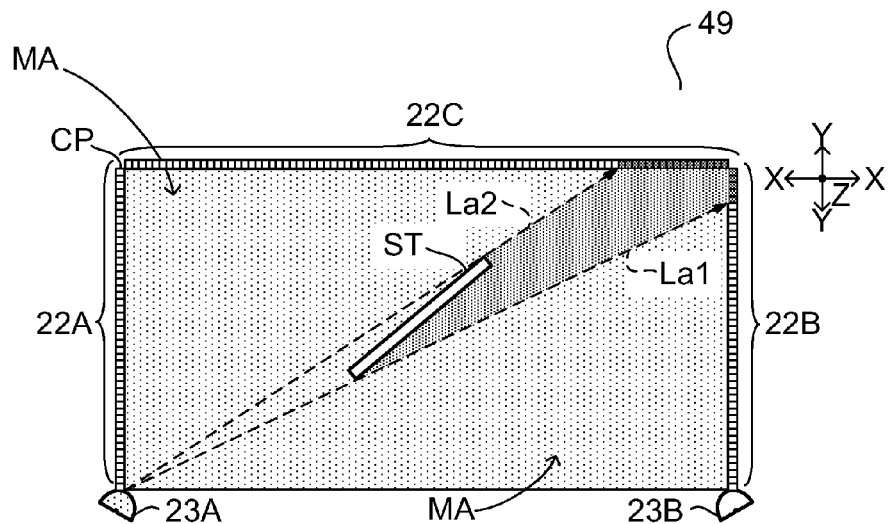
FIG. 22 (A) is a plan view showing a shadow that is created in a case where one of two LEDs emits light to a rod; and (B) is a description view in which graphs indicating a signal intensity of the line sensor unit in FIG. 22A are ranged.

Here, in the shadow count, as shown in FIG. 22A, when the light from the LED 23A is casted on to the rod ST that is the object, the shadow extends along the travel direction of the light from the LED 23A and reaches some of the line sensors 22B, 22C of the line sensor unit 22U (here, a thick hatched portion from the rod ST that is the object (block body) means the shadow, a thin hatching other than this means a region where the light is casted, and the hatched LED 23A means that the LED 23 is emitting light).

Figure 22B:
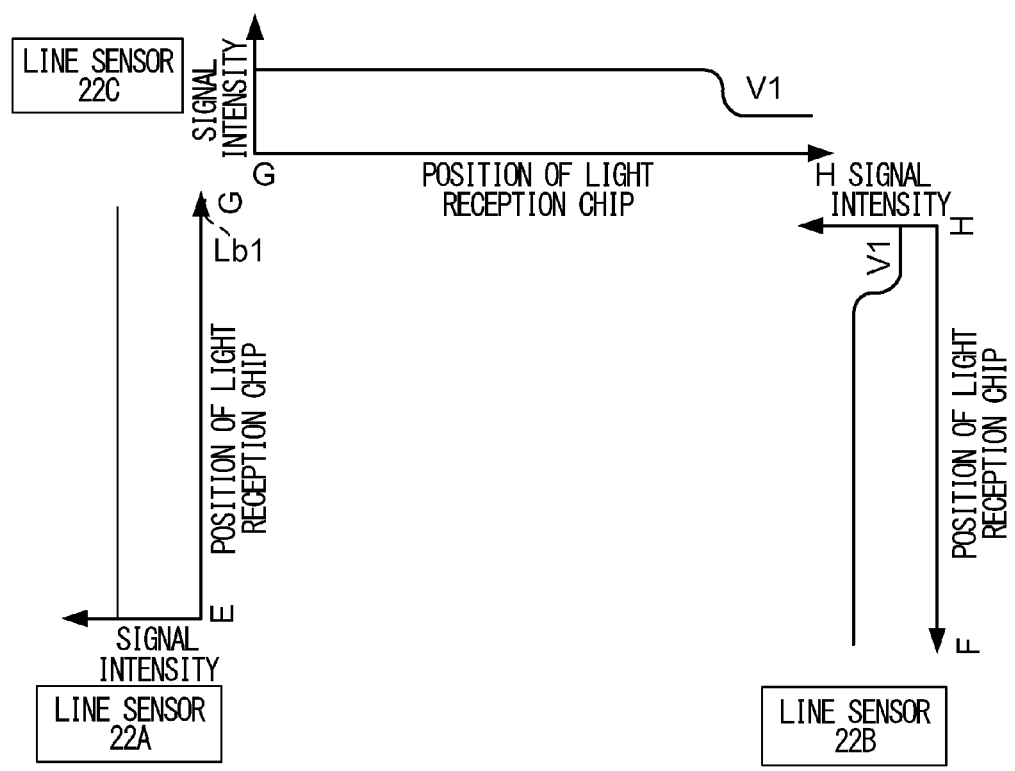

According to this, as shown in FIG. 22B, a change region V1 occurs in light reception data (light reception signal) at the line sensor unit 22U (here, dispositions of graphs indicating the light reception data in the figure are aligned with the positions of the line sensors 22A to 22C).

Figure 23A:
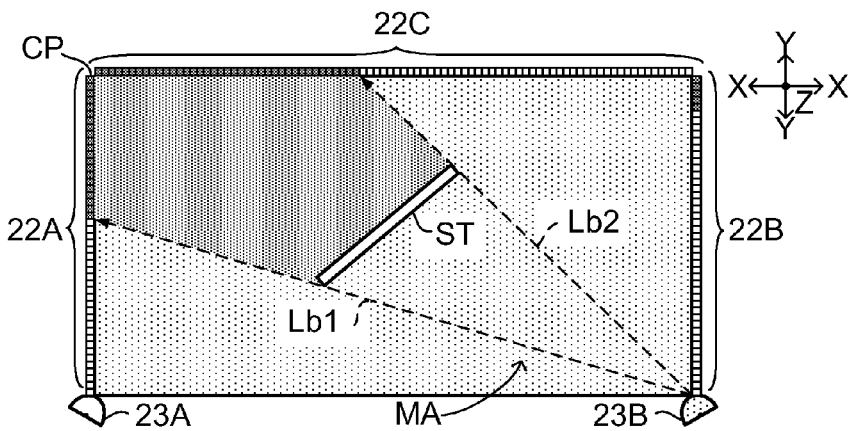
FIG. 23 (A) is a plan view showing a shadow that is created in a case where the other of two LEDs emits light to a rod; and (B) is a description view in which graphs indicating a signal intensity of the line sensor unit in FIG. 23A are ranged.
Figure 23B:
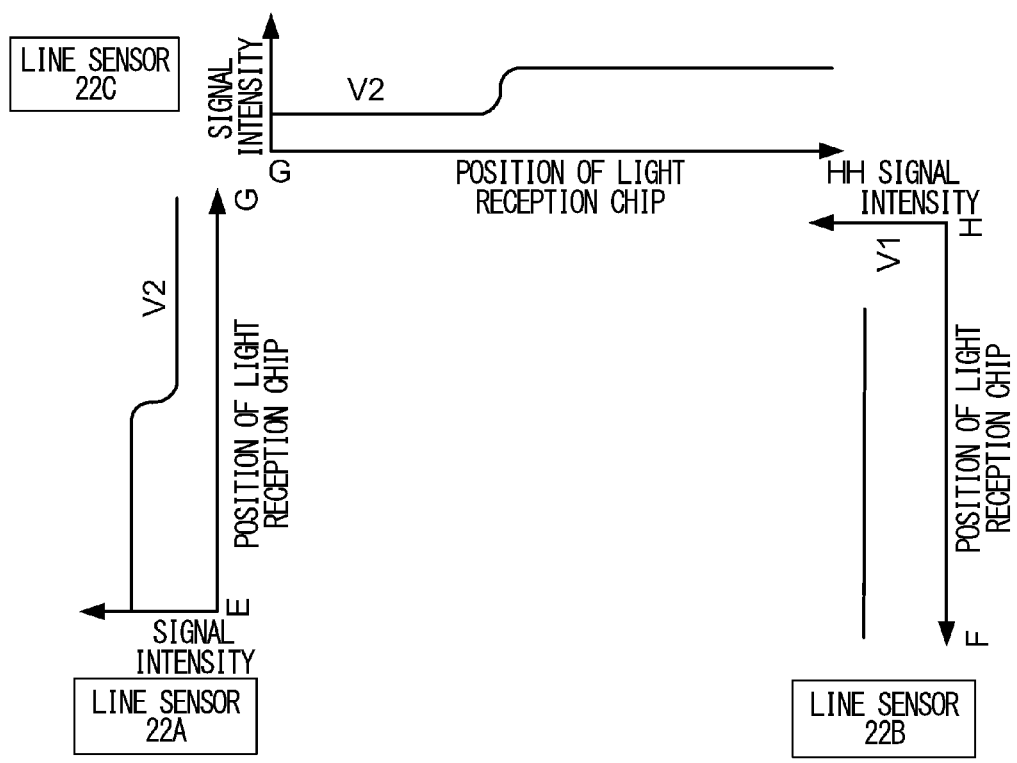

Besides, as shown in FIG. 23A, when the light from the LED 23B is casted on to the rod ST that is the object, the shadow extends along the travel direction of the light from the LED 23B and reaches some of the line sensors 22A, 22C of the line sensor unit 22U. According to this, as shown in FIG. 23B, a change region V2 occurs in the light reception data (light reception signal) at the line sensor unit 22U.

And, the detection management portion 14, based on the number of change regions V (V1, V2) occurring in the light reception data (the signal intensity of the data signal) at the line sensor unit 22U, counts the number of shadows lying on the line sensor unit 22U.

Besides, the detection management portion 14, from data of the coordinate map region MA obtained from the memory 13, finds which section the shadow occupies in the outermost linear region of the coordinate map region MA.

In detail, the detection management portion 14 finds which serial sections the shadow occupies in a line-shaped section region from the base section O to the section G, a line-shaped section region from the section G to the section I, and a line-shape section region from the section I to the section F [found section data set process]. And, the detection management portion 14 transmits the data (found section data) of the found sections to the intersection set portion 15.

The intersection set portion 15 uses the found section data transmitted from the detection management portion 14 to set connection lines L in the coordinate map region MA (connection line set process) and obtains intersections of these connection lines L. The connection lines L are connection lines [first connection lines] that, in the coordinate map region MA, connect the outermost two sections of a plurality of sections (found section data) ranged linearly that indicate the shadow to the output points of the LED 23.

For example, in a case where the LED 23A emits light (see FIG. 1A, FIG. 21B), based on the found section data that show the shadow of the rod ST, the respective sections at both ends are connected to the base section O that is the section which indicates the output point of the LED 23A, whereby an connection line La1 and a connection line La2 are set (here, the connection line L, which connects the section indicating the end of the shadow near the LED 23B to the base section O, is defined as the connection line La1, while the connection line L, which connects the section indicating the end of the shadow distant from the LED 23B to the base section O, is defined as the connection line La2).

Next, in a case where the LED 23B emits light (see FIG. 1B, FIG. 21B), based on the found section data that show the shadow of the rod ST, the respective sections at both ends are connected to the section F that is the section which indicates the output point of the LED 23B, whereby a connection line Lb1 and a connection line Lb2 are set (here, the connection line L, which connects the section indicating the end of the shadow near the LED 23A to the section F, is defined as the connection line Lb1, while the connection line L, which connects the section indicating the end of the shadow distant from the LED 23A to the section F, is defined as the connection line Lb2).

And, four intersections of the four connection lines L shown in FIG. 2 are created. An intersection E1 of the connection line La1 and the connection line Lb1 is calculated as follows [intersection set process].

Figure 3:
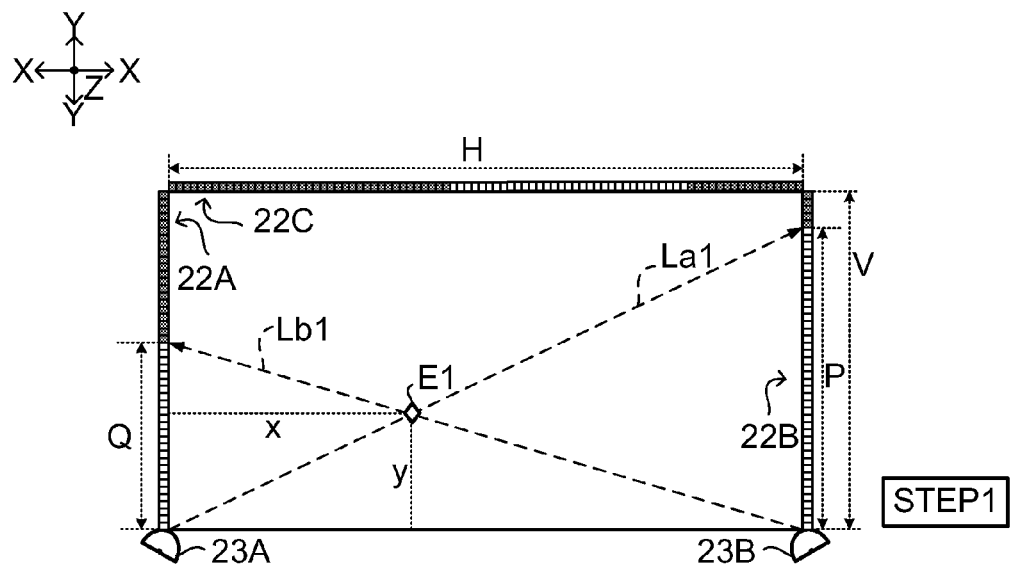
FIG. 3 is a plan view showing a position of one of four intersections that are created by crossing-over of connections lines.

Here, as shown in FIG. 3, a length (the number of sections in the coordinate map region MA) of the calculated intersection E1 in the X direction is defined as "x", a length in the Y direction is defined as "y." Besides, in FIG. 21B, in the line-shaped section region from the section I to the section F, a length from one end of the shadow created by the light emission from the LED 23A to the section F is defined as "P"; in the line-shaped section region from the base section O to the section G, a length from one end of the shadow created by the light emission from the LED 23B to the base section O is defined as "Q"; a total length (e.g., the number of sections from the base section O to the section F) of the coordinate map region MA in the X direction is defined as "H"; and a total length (e.g., the number of sections from the base section O to the section G) of the coordinate map region MA in the Y direction is defined as "V."

According to this, the "x" and "y" of the intersection E1 shown in FIG. 3, by calculation using the following formulas (1) and (2), are obtained "x=H×Q/(P+Q)" and "y=P×Q/(P+Q)".

$$x:y=H:P \qquad \text{formula (1)}$$

$$(H-x):y=H:Q \qquad \text{formula (2)}$$

Figure 4:
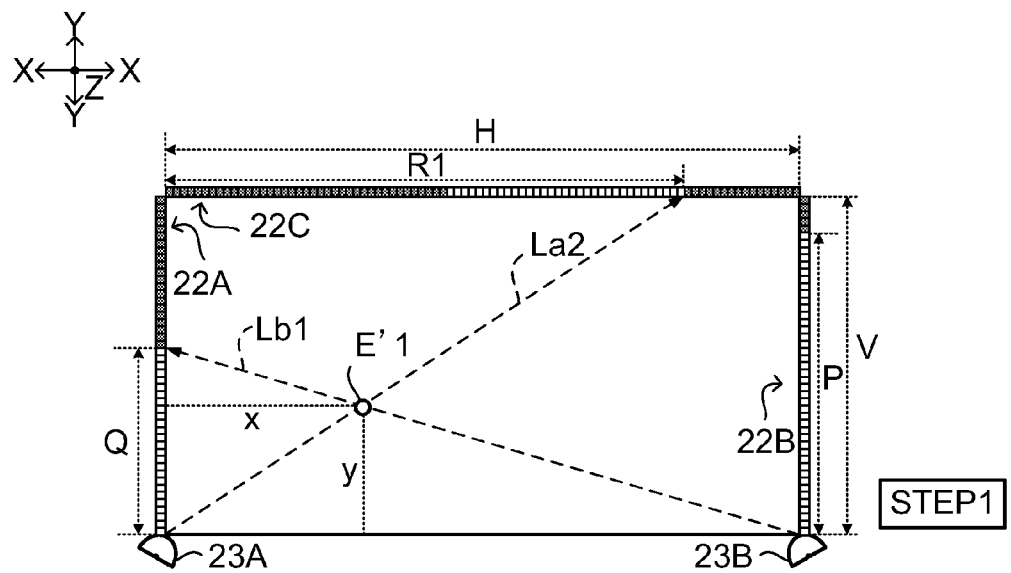
FIG. 4 is a plan view showing a position of one of four intersections that are created by crossing-over of connections lines.

Besides, when a length, in the X direction, of an intersection E'1 of the connection line La2 and the connection line Lb1 shown in FIG. 4 is defined as "x"; and a length in the Y direction is defined as "y", by calculation using the following formulas (3) and (4), the "x" and "y" are obtained "x=R1×Q×H/(V×H+R1×Q)" and "y=Q×H×V/(V×H+R1×Q)". Here, in the line-shaped section region from the section G to the section I, a length from one end of the shadow created by the light emission from the LED 23A to the section G is defined as "R1" (see FIG. 4 and FIG. 21B).

$$x:y=R1:V \qquad \text{formula (3)}$$

$$(H-x):y=H:Q \qquad \text{formula (4)}$$

Figure 5:
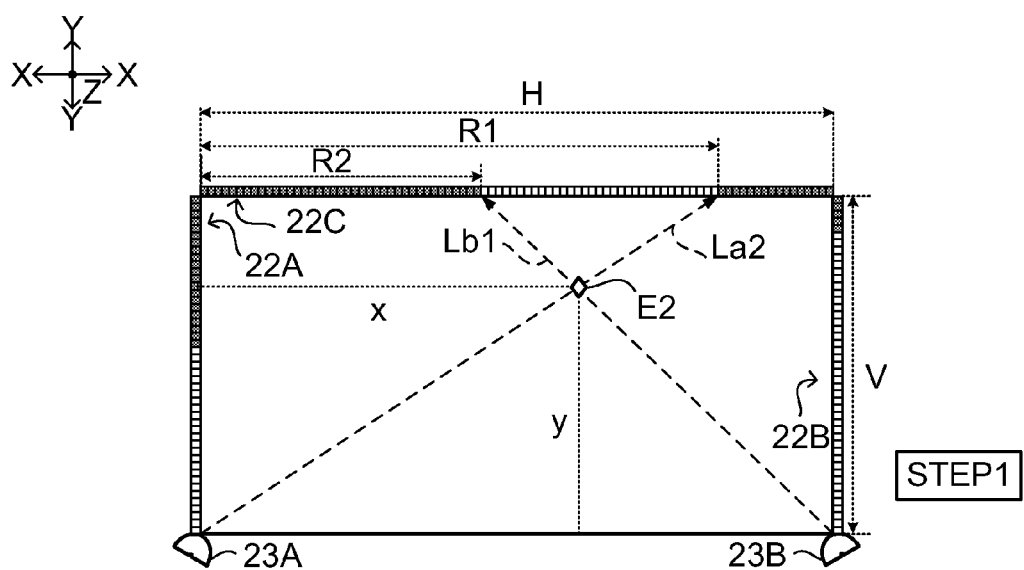
FIG. 5 is a plan view showing a position of one of four intersections that are created by crossing-over of connections lines.

Besides, when a length, in the X direction, of an intersection E2 of the connection line La2 and the connection line Lb2 shown in FIG. 5 is defined as "x"; and a length in the Y direction is defined as "y", by calculation using the following formulas (5) and (6), the "x" and "y" are obtained "x=R1×H/(H−R2+R1)" and "y=V×H/(H−R2+R1)". Here, in the line-shaped section region from the section G to the section I, a length from one end of the shadow created by the light emission from the LED 23B to the section G is defined as "R2" (see FIG. 5 and FIG. 21B).

$$x:y=R1:V \qquad \text{formula (5)}$$

$$(H-x):y=(H-R2):V \qquad \text{formula (6)}$$

Figure 6:
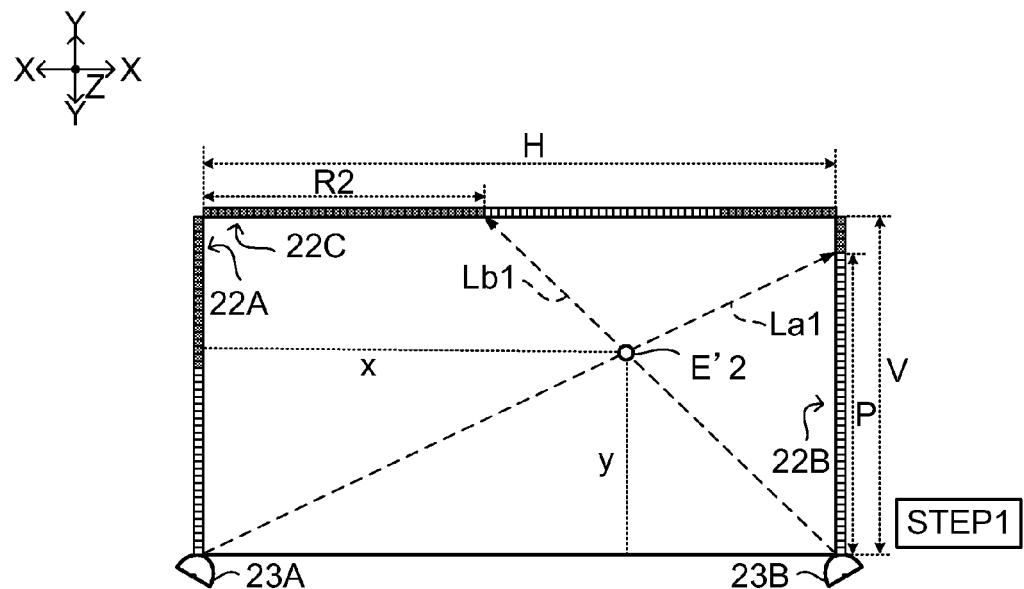
FIG. 6 is a plan view showing a position of one of four intersections that are created by crossing-over of connections lines.

Besides, when a length, in the X direction, of an intersection E'2 of the connection line La1 and the connection line Lb2 shown in FIG. 6 is defined as "x"; and a length in the Y direction is defined as "y", by calculation using the following formulas (7) and (8), the "x" and "y" are obtained "x=V×H×H/(P×H−P×R2+V×H)" and "y=P×V×H/(P×H−P×R2+V×H)."

$$x:y=H:P \qquad \text{formula (7)}$$

$$(H-x):y=(H-R2):V \qquad \text{formula (8)}$$

The position find portion 16, from the four intersections (E1, E'1, E2, E'2) calculated by the intersection set portion 15, finds two intersections which actually indicate the end portions of the rod ST [position find process]. Specifically, as shown in FIG. 2, the position find portion 16, of the four intersections (E1, E'1, E2, E'2) situated circularly, connects opposing intersections to each other, that is, connects from the intersection E1 to the intersection E2 and connects from the intersection E'1 to the intersection E' 2 (here, these connected lines are defined as an inter-connection line E1E2 and an inter-connection line E'1E'2).

Further, the position find portion 16 obtains a length of the inter-connection line E1E2 and a length of the inter-connection line E'1E'2. Thereafter, the position find portion 16 compares each of a total length of the inter-connection line E1 E2 and a total length of the inter-connection line E'1E'2 with the total length of the rod ST [comparison process]. And, the position find portion 16 finds the inter-connection line E1E2, which has a length approximate to the total length of the rod ST, as the position of the rod ST. In other words, in the case where the rod ST rotates, the inter-connection line E1E2, which is defined by the intersection E1 and the intersection E2 that lie on a circular locus drawn by the end of the rod ST, is found as the position of the rod ST (here, it is sayable that the intersection E1 and the intersection E2 are real points, and it is sayable that the intersection E'1 and the intersection E'2 are virtual points).

Figure 7:
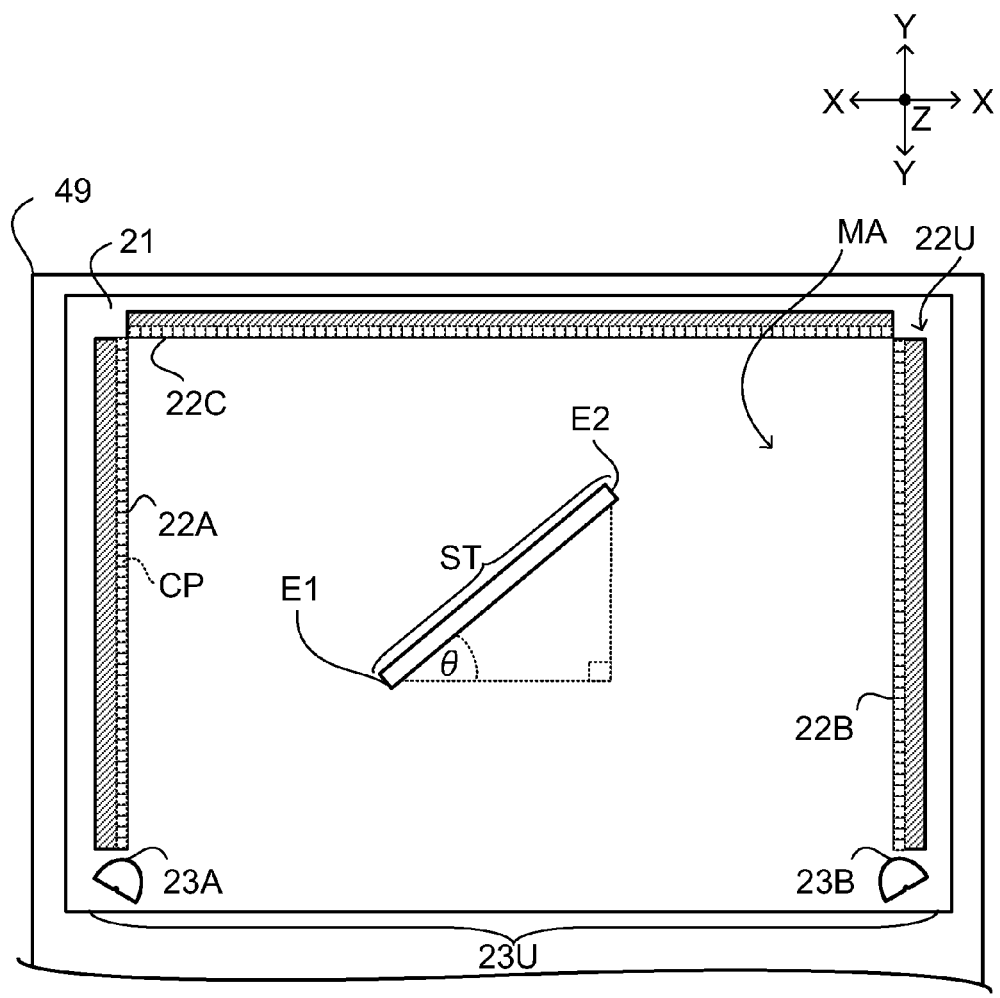
FIG. 7 is a plan view showing an inclination angle (θ) of an inclined rod.

Here, the inclination (θ) and length of the rod ST shown in FIG. 7 are obtained by triangulation that uses position information of the intersection E1 and the intersection E2 to assume a right triangle (here, the apex which forms the right angle is a virtual point other than the intersection E1 and the intersection E2).

Figure 8A:
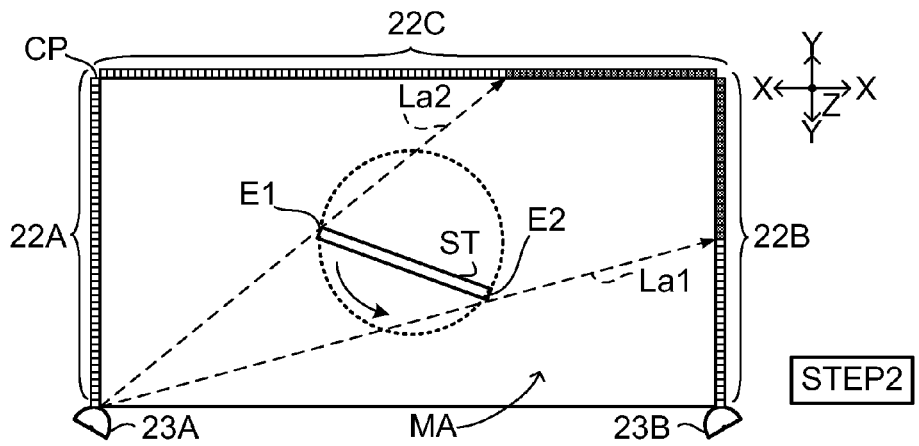
FIG. 8 (A) is a plan view showing a connection line that is created in a case where one of two LEDs emits light to a rod; and (B) is a plan view showing a connection line that is created in a case where the other of the two LEDs emits light to the rod.
Figure 8B:
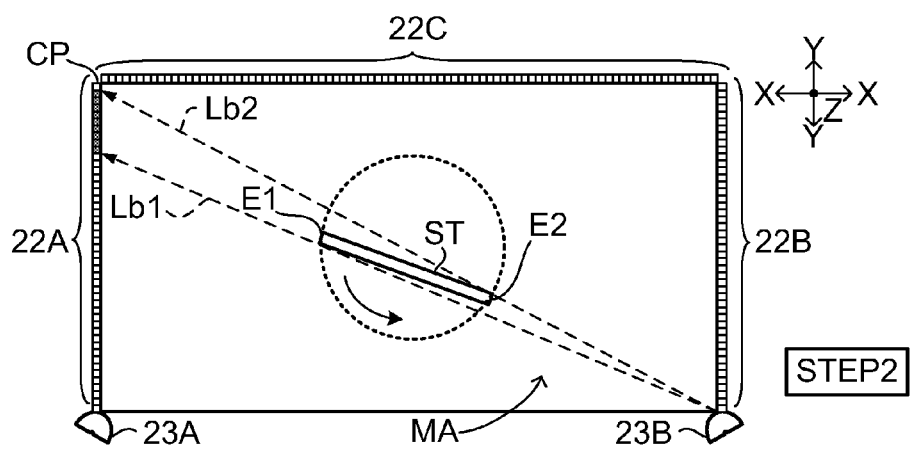
Figure 9:
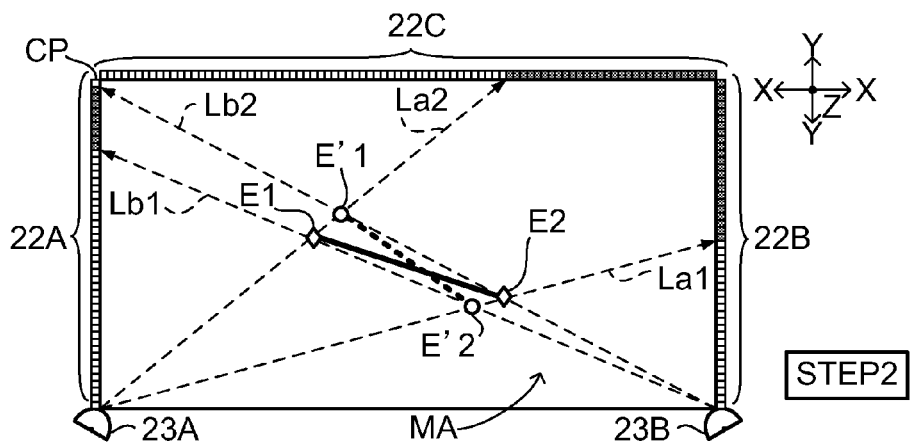
FIG. 9 is a plan view showing both connection lines shown in FIG. 8A and FIG. 8B.
Figure 10A:
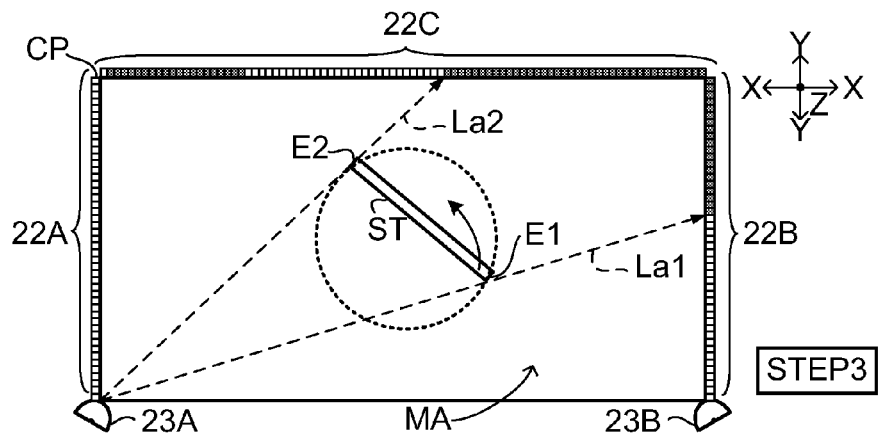
FIG. 10 (A) is a plan view showing a connection line that is created in a case where one of two LEDs emits light to a rod; and (B) is a plan view showing a connection line that is created in a case where the other of the two LEDs emits light to the rod.
Figure 10B:
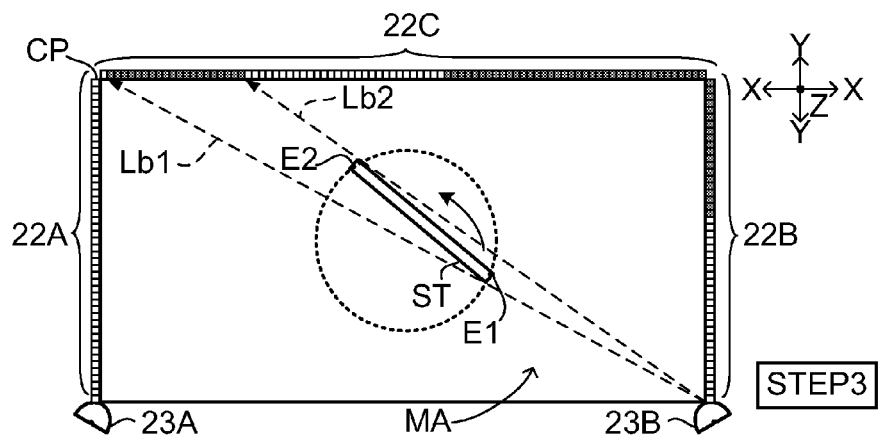
Figure 11:
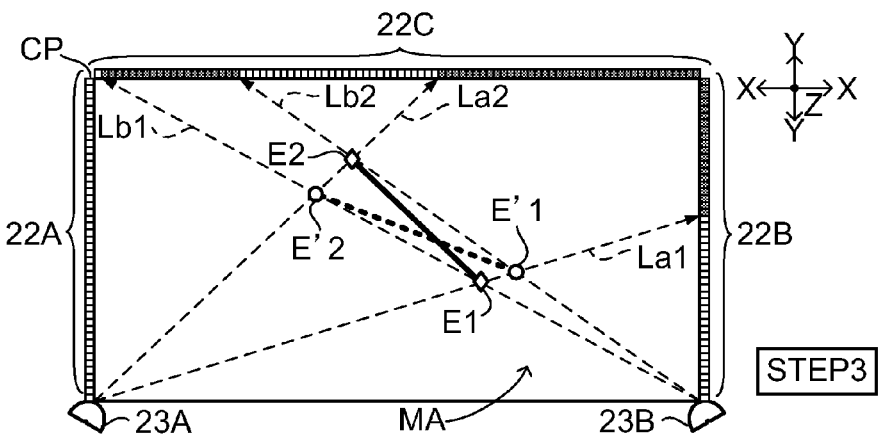
FIG. 11 is a plan view showing both connection lines shown in FIG. 10A and FIG. 10B.

Besides, as shown in FIG. 8A, FIG. 8B, and FIG. 9 (STEP 2), even in a case where the rod ST rotates counterclockwise in the coordinate map region MA; then, as shown in FIG. 10A, 10B, and FIG. 11 (STEP 3), the rod ST rotates counterclockwise, the position detection unit 12, of two inter-connection lines created by connecting opposing intersections of the four intersections (E1, E2, E'1, E'2), finds the inter-connection line E1E2, which has a length approximate to the total length of the rod ST, as the position of the rod ST.

In detail, in the case of FIG. 8A, FIG. 8B and FIG. 9 (case of STEP 2), the intersection of the connection line La2 and the connection line Lb1 is the intersection E1 that is a real point, while the intersection of the connection line La1 and the connection line Lb2 is the intersection E2 that is a real point. On the other hand, the intersection of the connection line La2 and the connection line Lb2 is the intersection E'1 that is a virtual point, while the intersection of the connection line La1 and the connection line Lb1 is the intersection E'2 that is a virtual point (here, in the case of the STEP 2, unlike the case of the STEP 1 shown in FIG. 1A, FIG. 1B and FIG. 2, the connection lines L which form the real point and the virtual point are different from each other in kind).

Besides, in the case of FIG. 10A, FIG. 10B and FIG. 11 (case of STEP 3), the intersection of the connection line La1 and the connection line Lb1 is the intersection E1 that is a real point, while the intersection of the connection line La2 and the connection line Lb2 is the intersection E2 that is a real point. On the other hand, the intersection of the connection line La1 and the connection line Lb2 is the intersection E'1 that is a virtual point, while the intersection of the connection line La2 and the connection line Lb1 is the intersection E'2 that is a virtual point (here, in the case of the STEP 3, unlike the case of the STEP 2 shown in FIG. 8A, FIG. 8B and FIG. 9, the connection lines L which form the real point and the virtual point are different from each other in kind).

In other words, of the two inter-connection lines created by connecting the opposing intersections of the four intersections (E1, E'1, E2, E'2) created in the case where the rod ST rotates, one inter-connection line indicates the position of the rod ST (in other words, it is sufficient if the position detection unit 12 is able to select either of the two inter-connection lines).

Summing up the above description, in the case where the rod ST lying on the coordinate map region MA rotates and the end of the rod ST draws a circular locus, the position detection unit 12 functions as follows. Specifically, the position detection unit 12 turns on independently each of the plurality of LEDs 23 (23A, 23B); by turning on one of the LEDs 23, creates one shadow of the one rod ST; by turning on the other one of the LEDs 23, creates one shadow of the one rod ST, and detects a total of two shadows.

And, the position detection unit 12 connects each of the LEDs 23 to both ends of the shadow on the line sensor unit 22U based on each of the LEDs 23 to create the four connection lines L in total, and finds the four intersections of the four connection lines L. Further, the position detection unit 12 finds the inter-connection line E1 E2, which is one of the two inter-connection lines E1E2 and E'1E'2 created by connecting the opposing intersections of the four intersections (E1, E'1, E2, E'2) to each other and has the length approximate to the total length of the rod ST, as the position of the rod ST that lies on the coordinate map region MA.

Figure 12:
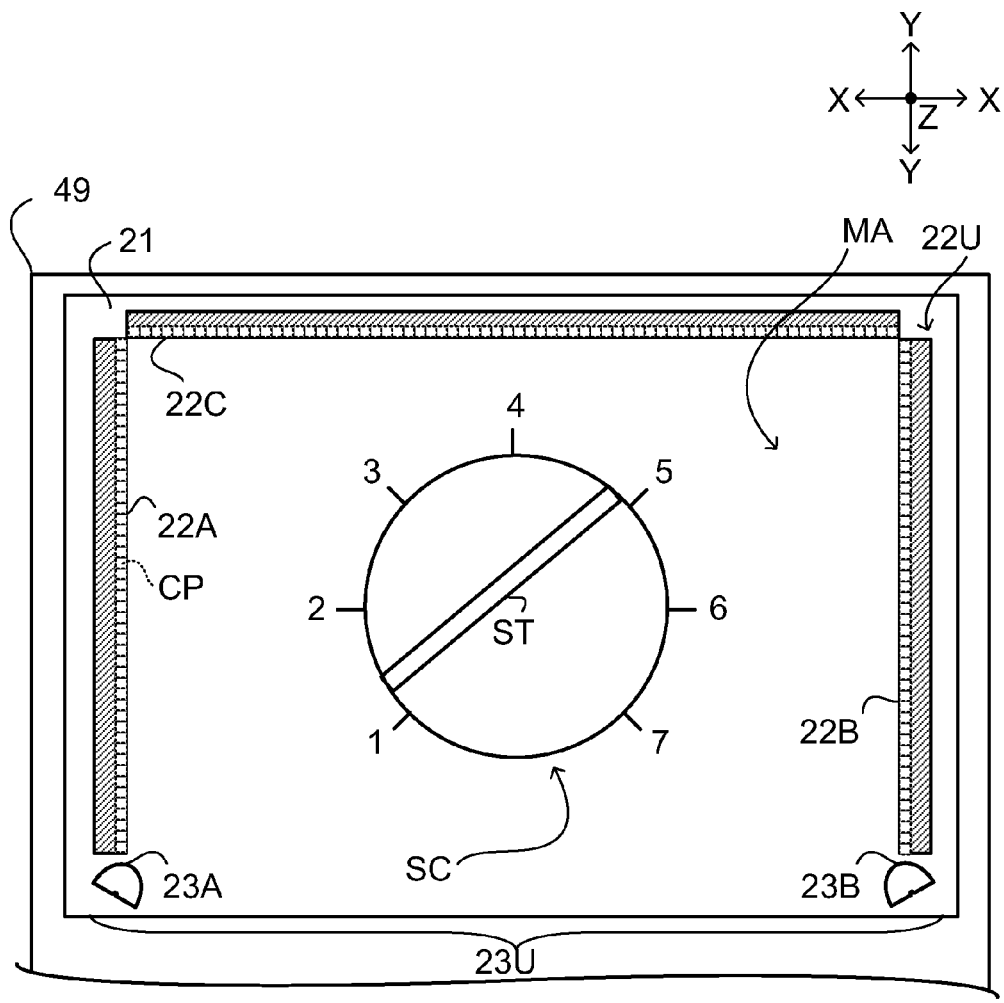
FIG. 12 is a plan view showing a use example of a rod.

In other words, the position detection system PM that includes such position detection unit 12 is able to find the position (of course, also the inclination of the rod ST) of the rod ST on the coordinate map region MA. Because of this, for example, as shown in FIG. 12, it is also possible that on the liquid crystal display panel 49, a circular scale SC is displayed; and a reading of the scale SC is found by means of the rod ST. Here, in a case where the rod ST continues to rotate, the position detection unit 12 (in detail, the position find portion 16) is able to find the rotation direction as well of the rod ST depending on whether the inclination θ shown in FIG. 7 indicates an increase tendency or a decrease tendency.

Figure 13:
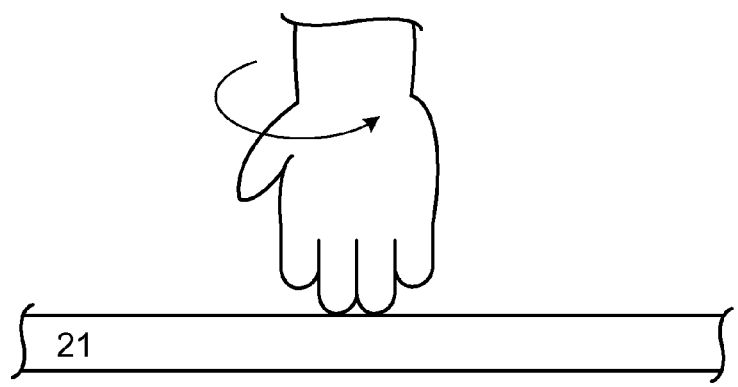
FIG. 13 is a description view showing a hand whose position is detected by a position detection system.

Besides, the position detection system PM, as shown in FIG. 13, is able to recognize a gesture as well in which fingers are closed to each other, placed on the protection board 21 of the coordinate map region MA and rotated.

Here, there is also a case where the light travels through fingers and the shadow on the line sensor unit 22U includes a slightly shiny portion. However, the intersection set portion 15 of the position detection unit 12 neglects the slightly shiny portion included in the found section data, and recognizes the shadow sandwiching the slightly shiny portion as one shadow (here, it is possible to arbitrarily set the number of shiny portions included in the found section data of the shadow). Accordingly, the position detection system PM is able to surely recognize a gesture of fingers.

Here, in the above description, the position detection system PM finds the position of the rod ST by means of the length of the inter-connection line E1 E2. However, the way of finding the position of the rod ST is not limited to this. For example, in a case where a diameter of the circular scale SC shown in FIG. 12 is equal to the total length of the rod ST; and the rod ST rotates with the end of the rod ST completely lying on the circular scale SC (e.g., in a case where the rod ST rotates being limited by a guide or the like), the position of the rod ST may be found by means of a central position of the circle.

Figure 14:
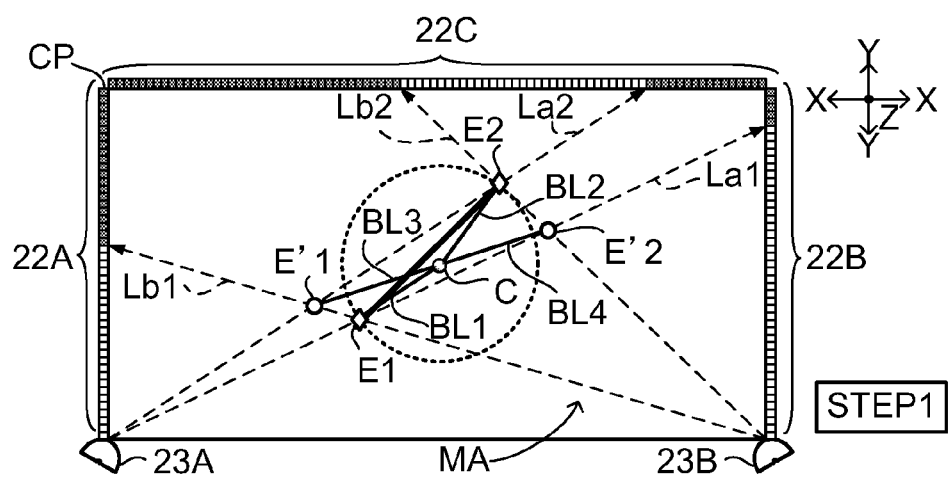
FIG. 14 is a plan view showing a connection line that is set for position detection of a rod.

In detail, as shown in FIG. 14, the position find portion 16 connects each of the four intersections (E1, E'1, E2, E'2) calculated by the intersection set portion 15 to a central point C of the circular scale SC to create connection lines BL (BL1 to BL4; second connection lines) (here, the rod ST lying on the coordinate map region MA rotates, whereby the circular locus drawn by the end of the rod ST and the circular scale SC lie on each other).

Further, the position find portion 16 finds the line (inter-connection line E1E2), which is created by connecting the intersection E1 and the intersection E2 that are included in the two of the connection line BL1 and the connection line BL2 which have a length approximate to the radius of the circular scale SC, as the position of the rod ST that lies on the coordinate map region MA (in short, the position detection unit 12 finds an inter-connection line, which is created by connecting two intersections of the four intersections that lie on the circular scale SC, as the position of the rod ST that lies on the coordinate map region MA).

As describe above, also by using the central point C of the circular scale SC, it is possible to find the position of the rod ST. And, in such finding, the rod ST rotates along the predetermined scale SC on the coordinate map region MA, so that detection position accuracy of the rod ST becomes relatively high. In other words, in the case where the line, which is one of the two inter-connection lines created by connecting the opposing intersections of the four intersections (E1, E'1, E2, E'2) and has the length approximate to the total length of the rod ST, is found as the position of the rod ST, the position of the rod ST is detected even if the rod ST rotates deviating somewhat from the circular scale SC, for example.

Other Embodiments

Here, the present invention is not limited to the above embodiments and variously modifiable without departing from the spirit of the present invention.

Figure 15A:
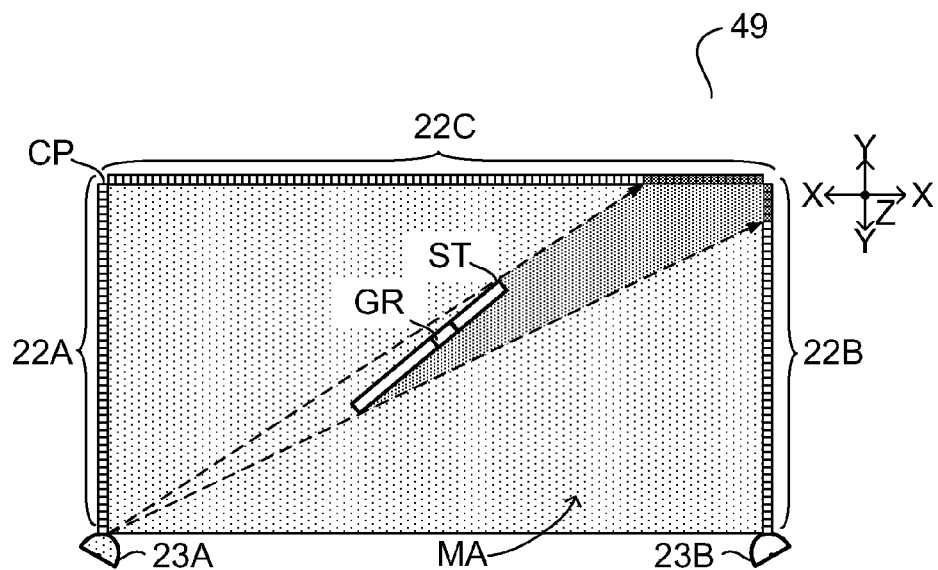
FIG. 15 (A) is a plan view showing a state in which one of two LEDs emits light to a grooved rod; and (B) is a plan view showing a state in which the other of the two LEDs emits light to the grooved rod.
Figure 15B:
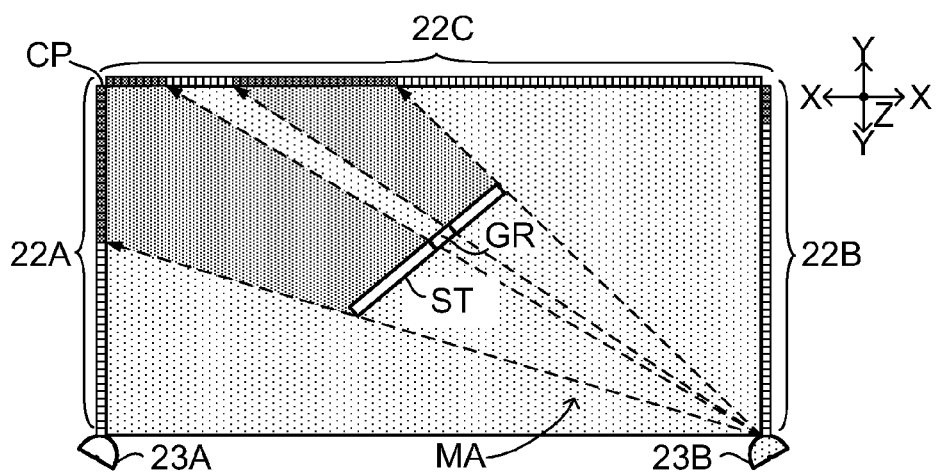

For example, as shown in FIG. 15A and FIG. 15B, a groove GR having a predetermined width may be formed on the rod ST. According to this, the position detection system PM is able to detect a rough inclination of the rod ST in an early stage. In detail, the position detection system PM finds out that on the coordinate map region MA, the rod ST is inclined along one of the direction (that is, the light output direction from the LED 23A) extending from the base section O to the section I and the direction (that is, the light output direction from the LED 23B) extending from the section F to the section G.

For example, in a case where the rod ST is inclined, even when the LED 23A emits light, the light does not travel through the grove GR of the rod ST (see FIG. 15A). Because of this, only one shadow caused by the rod ST is created. On the other hand, when the LED 23B emits light, the light travels through the groove GR of the rod ST (see FIG. 15B). Because of this, the shadow caused by the rod ST is divided into two shadows.

As described above, in the case where the shadow is divided (that is, in a case where a shiny portion is included in the found section data), the position detection system PM (in detail, the position find portion 16) judges that the rod ST is along the light output direction from the LED 23A different from the LED 23B that emits the light to the rod ST which creates the shadow.

In the meantime, for example, in the position detection of the rod ST by the position detection system PM shown in FIG. 2 and the like, the total length of the rod ST must be recognized beforehand by the position detection unit 12. Because of this, for example, a user inputs the total length of the rod ST on a not-shown input portion of the position detection system PM. And, the position detection unit 12 uses the input value to perform various calculations to find the position of the rod ST.

Figure 16A:
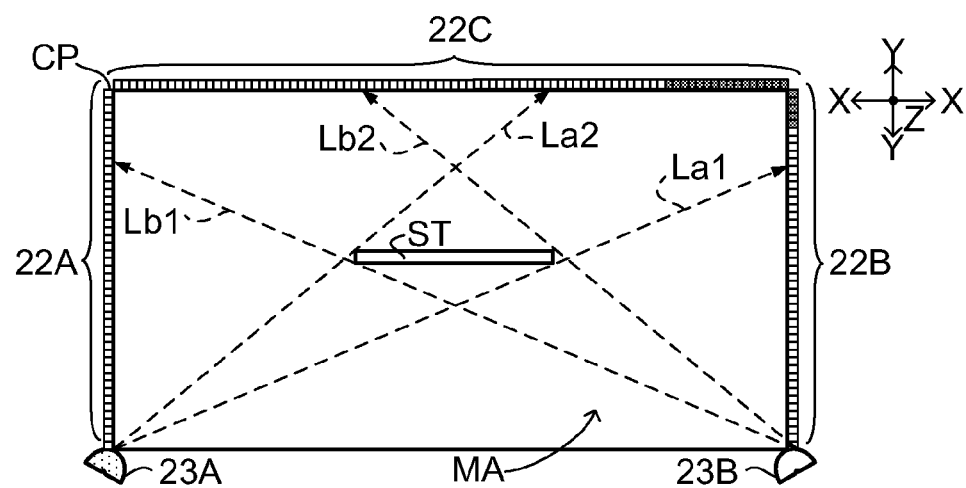
FIG. 16 (A) is a plan view showing all connection lines that are created in a case where a rod is situated in parallel with a line sensor 22C; and (B) is a plan view showing a intersection of the connection lines.
Figure 16B:
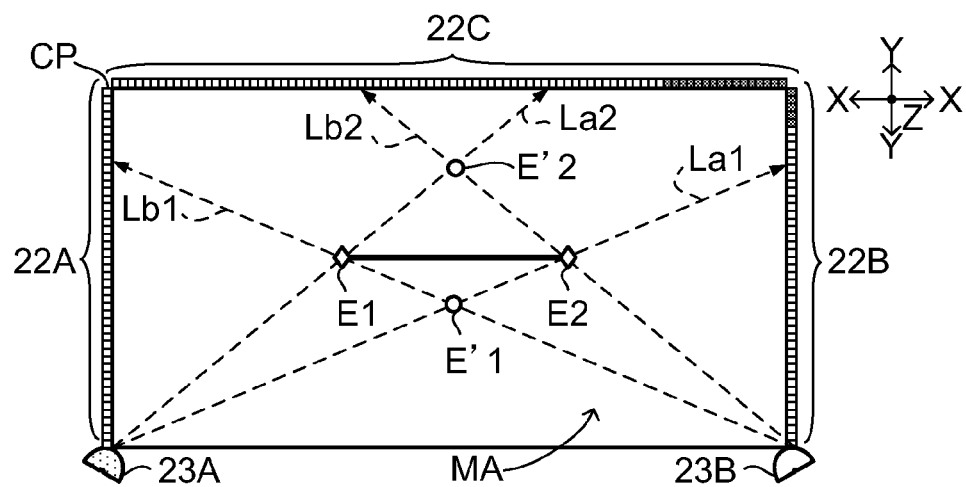

However, preparing for a case where the total length of the rod ST is unclear, the position detection system PM has a function as well to measure the total length of the rod ST. For example, as shown in FIG. 16A and FIG. 16B, in a case where the rod ST is disposed in parallel with the central line sensor 22C that is one of the three linear line sensors 22A to 22C ranged, the position detection unit 12 finds the length of the inter-connection line (inter-connection line E1E2), which is one of the two inter-connection lines (inter-connection line E1E2 and inter-connection line E'1E'2) created by connecting the opposing intersections of the four intersections (E1, E'1, E2, E'2) calculated from the connection lines L and is parallel with the line sensor 22C, as the total length of rod ST.

According to this, even if the position detection unit 12 does not recognize the total length of the rod ST that rotates, it is possible to find the position of the rod ST that rotates (in short, is inclined).

Figure 17:
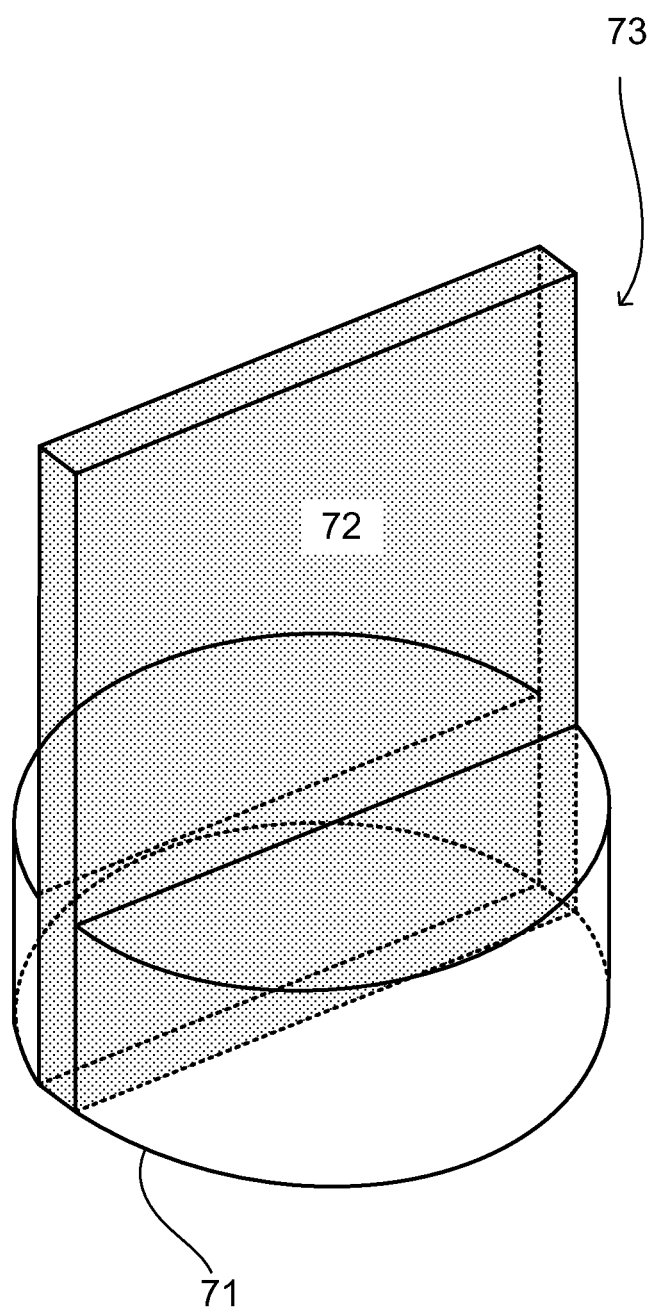
FIG. 17 is a perspective view of a unit that functions in the same way as a rod.

Besides, for the position detection system PM, the rod ST is described as an example of a block body, but the block body is not limited to this. For example, as shown in FIG. 17, a unit 73, in which a quadrangular pillar piece member 72 that does not transmit light is fitted in a disc 71 that has the same outer shape as the circular scale SC and is transparent (has transmissiveness), may be used as a block body. According to such unit 73, a portion of the piece member 72 enclosed by the disc 71 serves as a block body like the rod ST.

Figure 18:
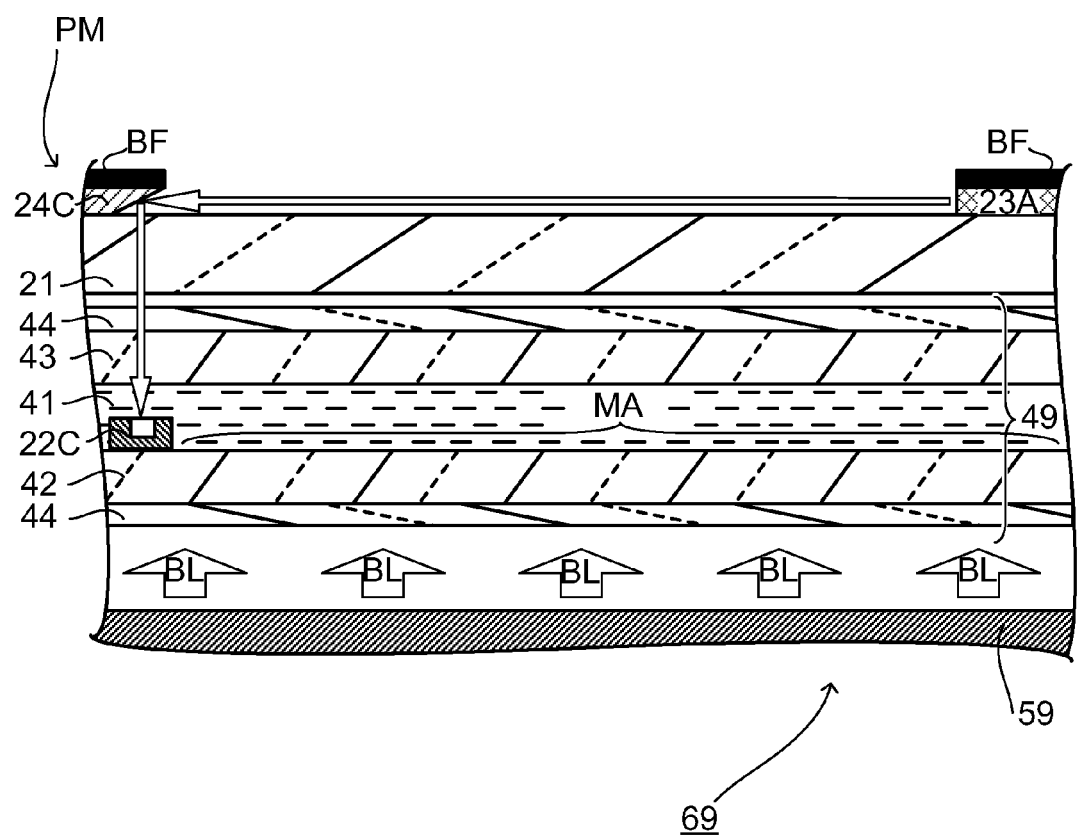
FIG. 18 is a partially sectional view of a liquid crystal display device.

Besides, the line sensor unit 22U of the position detection system PM, as shown in FIG. 19, FIG. 20 and the like, is not always situated on the protection board 21. As an example, the position detection system PM shown in FIG. 18 also is possible.

Specifically, a linear reflection mirror 24A is situated instead of the line sensor 22A that is situated on the protection board 21 in FIG. 20 and the like; a linear reflection mirror 24B is situated instead of the line sensor 22B; and a linear reflection mirror 24C is situated instead of the line sensor 22C. Further, the line sensors 22A to 22C are disposed on the active matrix board 42 overlapping the reflection mirrors 24A to 24C.

And, in the reflection mirrors 24A to 24C (reflection mirror set 24U), a minor surface of the reflection mirror 24A is inclined to receive the light from the LED unit 23U while facing toward a light reception surface of the line sensor 22A; a mirror surface of the reflection mirror 24B is inclined to receive the light from the LED unit 23U while facing toward a light reception surface of the line sensor 22B; further, a mirror surface of the reflection mirror 24C is inclined to receive the light from the LED unit 23U while facing toward a light reception surface of the line sensor 22C.

Here, in the liquid crystal display panel 49 that includes such position detection system PM, the coordinate map region MA occurs on the active matrix board 42. However, the protection board 21 is situated to cover the coordinate map region MA, so that the object placed on the protection board 21 lies over the coordinate map region MA. Because of this, even in the case of the position detection system PM shown in FIG. 18, the object receives the light from the LED unit 23U to create a shadow, and the line sensor unit 22U obtains light reception data that is changed by the shadow.

Besides, in the above description, as the point light source, the LED 23 that is a light emitting element is described as an example, but is not limited to this. For example, a light emitting element like a laser element may be used, or a light emitting element, which is formed of a self-light emitting material like an organic EL (Electro-Luminescence) or an inorganic EL, may be used. Besides, not being limited to the light emitting elements, a point light source like a lamp may be used.

Besides, in the above description, as the display device, the liquid crystal display device 69 is described as an example, but is not limited to this. For example, the position detection system PM may be incorporated in other display devices like a plasma display device or an electronic copy board.

In the meantime, the above position detection is realized by a position detection program. And, this program is a program executable on a computer, and may be recorded in a record medium that is readable by a computer. This is because the program recorded in the record medium becomes portable.

Here, as this record medium, there are: tape relatives such as a magnetic tape, a cassette tape and the like that are removable; disc relatives such as a magnetic disc, an optical disc like a CD-ROM and the like; card relatives such as an IC card (inclusive of a memory card), an optical card and the like; and semiconductor relatives such as a flash memory and the like.

Besides, the microcomputer unit 11 may obtain the position detection program through communication over a communication network. Here, as the communication network, irrespective of cable or wireless, there are the Internet, infrared communication and the like.

REFERENCE SIGNS LIST

PM position detection system
11 microcomputer unit
12 position detection unit
13 memory
14 detection management portion
15 intersection set portion
16 position find portion
17 LED driver
21 protection sheet
22 line sensor (light reception line sensor)
22A line sensor
22B line sensor
22C line sensor
22U line sensor unit (light reception line sensor unit)
MA coordinate map region
23 LED (light source)
23U LED unit (light source unit)
L connection line (first connection line)
E1, E2 intersection (real intersection)
E'1, E'2 intersection (virtual intersection)
BL connection line (second connection line)
49 liquid crystal display panel (display panel, touch panel)
59 backlight unit (illumination device)
69 liquid crystal display device (display device)

The invention claimed is:

1. A position detection system comprising:
a light reception line sensor unit in which a light reception line sensor is disposed in an enclosure shape;
a plurality of light sources that emit light to an enclosure region enclosed by the enclosure shape to create a shadow of an object which lies on the enclosure region; and
a position detection unit that detects the shadow from light reception data of the light reception line sensor unit, and uses data based on the shadow to detect a position of the object by means of triangulation; wherein
in a case where the object lying on the enclosure region has a linear shape and rotates such that an end of the object draws a circular locus,
the position detection unit turns on independently each of the plurality of light sources, creates one shadow of the object by turning on one of the light sources, creates another shadow of the object by turning on another of the light sources, and detects a total of two shadows;
connects each of the light sources to both ends of the shadow on the light reception line sensor unit based on each of the light sources, thereby creating four first connection lines and finding four intersections of the four first connection lines; and
finds an inter-connection line created by connecting two intersections, which are intersections of the four intersections and lie on the circular locus, as the position of the object.

2. The position detection system according to claim 1, wherein
the inter-connection line is an inter-connection line which is one of two inter-connection lines created by connecting opposing intersections of the four intersections opposite to each other and has a length approximate to a total length in a linear direction of the object.

3. The position detection system according to claim 1, wherein
when four connection lines created by connecting each of the four intersections to a central point of the circular locus are each defined as a second connection line, a line, which is created by connecting intersections to each other which are included in two of the four second connection lines that have a length approximate to a radius of the circular locus, is the inter-connection line.

4. The position detection system according to claim 1, wherein
the light reception line sensor unit is disposed in a bracket shape with three of the light reception line sensors being linear and meeting one another; and
the position detection unit finds the total length of the linear object, which is disposed in parallel with a central light reception line sensor of the three linear light reception line sensors arranged, as a length of the inter-connection line which is one the two inter-connection lines created by connecting the opposing intersections of the four intersections and is parallel with the central light reception line sensor.

5. A display panel incorporating the position detection system according to claim 1.

6. A display device incorporating the display panel according to claim 5.

7. The position detection system according to 2, wherein
the light reception line sensor unit is disposed in a bracket shape with three of the light reception line sensors being linear and meeting one another; and
the position detection unit finds the total length of the linear object, which is disposed in parallel with a central light reception line sensor of the three linear light reception line sensors arranged, as a length of the inter-connection line which is one the two inter-connection lines created by connecting the opposing intersections of the four intersections and is parallel with the central light reception line sensor.

8. The position detection system according to 3, wherein
the light reception line sensor unit is disposed in a bracket shape with three of the light reception line sensors being linear and meeting one another; and
the position detection unit finds the total length of the linear object, which is disposed in parallel with a central light reception line sensor of the three linear light reception line sensors arranged, as a length of the inter-connection line which is one the two inter-connection lines created by connecting the opposing intersections of the four intersections and is parallel with the central light reception line sensor.

9. A display panel incorporating the position detection system according to claim 2.

10. A display panel incorporating the position detection system according to claim 3.

11. A display panel incorporating the position detection system according to claim 4.

12. A display panel incorporating the position detection system according to claim 7.

13. A display panel incorporating the position detection system according to claim 8.

14. A display device incorporating the display panel according to claim 9.

15. A display device incorporating the display panel according to claim 10.

16. A display device incorporating the display panel according to claim 11.

17. A display device incorporating the display panel according to claim 12.

18. A display device incorporating the display panel according to claim 13.

* * * * *